US010331279B2

United States Patent
Wachinger

(10) Patent No.: US 10,331,279 B2
(45) Date of Patent: Jun. 25, 2019

(54) SENSOR DEVICE AND METHOD FOR GENERATING ACTUATION SIGNALS PROCESSED IN DEPENDENCE ON AN UNDERLYING SURFACE STATE

(71) Applicant: AUDI AG, Ingolstadt (DE)

(72) Inventor: Michael Wachinger, Winkelhausen (DE)

(73) Assignee: AUDI AG, Ingolstadt (DE)

( * ) Notice: Subject to any disclaimer, the term of this patent is extended or adjusted under 35 U.S.C. 154(b) by 35 days.

(21) Appl. No.: 15/106,706

(22) PCT Filed: Nov. 22, 2014

(86) PCT No.: PCT/EP2014/003122
§ 371 (c)(1),
(2) Date: Jun. 20, 2016

(87) PCT Pub. No.: WO2015/090505
PCT Pub. Date: Jun. 25, 2015

(65) Prior Publication Data
US 2017/0003781 A1    Jan. 5, 2017

(30) Foreign Application Priority Data
Dec. 21, 2013    (DE) .................. 10 2013 021 875

(51) Int. Cl.
*G06F 3/044*    (2006.01)
*G06F 3/041*    (2006.01)
(Continued)

(52) U.S. Cl.
CPC .............. *G06F 3/044* (2013.01); *B60K 37/06* (2013.01); *G06F 3/0346* (2013.01); *G06F 3/0416* (2013.01)

(58) Field of Classification Search
None
See application file for complete search history.

(56) References Cited

U.S. PATENT DOCUMENTS 6,130,464 A *  10/2000  Carr ..................... G01P 15/036
                                                    257/417
8,531,398 B1 *  9/2013  Gopi .................... G06F 3/0346
                                                    345/158
(Continued)

FOREIGN PATENT DOCUMENTS

CN        103324098 A      9/2013
DE        197 29 784 A1    1/1998
(Continued)

OTHER PUBLICATIONS

International Search Report for CPT/EP2014/003122 dated Feb. 4, 2015.
(Continued)

*Primary Examiner* — Patrick N Edouard
*Assistant Examiner* — Peijie Shen
(74) *Attorney, Agent, or Firm* — Staas & Halsey LLP

(57) ABSTRACT

A transducer converts an actuation, applied to the transducer, into a raw actuation signal. The sensor device comprises an acceleration intermediary for converting an acceleration of the transducer into an actuation which is applied to the transducer, an underlying surface state detector for generating an underlying surface state signal by evaluating the raw actuation signal and an actuation signal generator for generating the actuation signal, processed in dependence on an underlying surface state, by evaluating the raw actuation signal taking into account the underlying surface state signal.

Furthermore, the invention relates to a corresponding vehicle and to a corresponding method for generating an actuation signal which is processed in dependence on an underlying surface state.

17 Claims, 3 Drawing Sheets

(51) Int. Cl.
 B60K 37/06 (2006.01)
 G06F 3/0346 (2013.01)

(56) References Cited

U.S. PATENT DOCUMENTS

| | | | | |
|---|---|---|---|---|
| 9,740,396 | B1* | 8/2017 | Ahaus | G06F 3/04886 |
| 2004/0025590 | A1* | 2/2004 | Schaad | G01P 15/097 |
| | | | | 73/514.29 |
| 2007/0057927 | A1* | 3/2007 | Prados | B60K 35/00 |
| | | | | 345/173 |
| 2007/0070046 | A1 | 3/2007 | Sheynblat et al. | |
| 2008/0289887 | A1* | 11/2008 | Flint | G06F 3/0414 |
| | | | | 178/18.03 |
| 2009/0133499 | A1 | 5/2009 | Cato | |
| 2011/0072880 | A1* | 3/2011 | Avery | G06F 1/1626 |
| | | | | 73/1.37 |
| 2011/0080349 | A1* | 4/2011 | Holbein | G06F 1/3203 |
| | | | | 345/173 |
| 2011/0084913 | A1 | 4/2011 | Wirtanen | |
| 2012/0026104 | A1* | 2/2012 | Ho | G06F 3/0418 |
| | | | | 345/173 |
| 2012/0223900 | A1* | 9/2012 | Jiyama | G06F 3/041 |
| | | | | 345/173 |
| 2013/0082939 | A1 | 4/2013 | Zhao et al. | |
| 2013/0099802 | A1* | 4/2013 | Hsieh | G06F 3/044 |
| | | | | 324/661 |
| 2013/0249869 | A1* | 9/2013 | Voss | G06F 3/0418 |
| | | | | 345/178 |
| 2013/0257807 | A1* | 10/2013 | Harris | G06F 3/0418 |
| | | | | 345/175 |
| 2013/0293364 | A1 | 11/2013 | Ricci et al. | |
| 2014/0025263 | A1* | 1/2014 | Geyer | B60K 35/00 |
| | | | | 701/49 |
| 2014/0344687 | A1* | 11/2014 | Durham | G06F 1/1686 |
| | | | | 715/716 |
| 2014/0354527 | A1* | 12/2014 | Chen | G06F 3/017 |
| | | | | 345/156 |
| 2015/0084849 | A1* | 3/2015 | Shin | G06F 3/017 |
| | | | | 345/156 |
| 2015/0301607 | A1* | 10/2015 | Saka | G06F 3/017 |
| | | | | 345/175 |
| 2015/0309576 | A1* | 10/2015 | Tissot | G06F 3/016 |
| | | | | 345/174 |
| 2016/0034067 | A1* | 2/2016 | Guenard | G01L 25/00 |
| | | | | 345/173 |
| 2016/0091978 | A1* | 3/2016 | Park | G06F 3/017 |
| | | | | 345/156 |
| 2016/0109949 | A1* | 4/2016 | Park | G06F 3/016 |
| | | | | 345/173 |
| 2016/0188113 | A1* | 6/2016 | Alpman | G06F 3/0418 |
| | | | | 345/173 |

FOREIGN PATENT DOCUMENTS

| | | |
|---|---|---|
| DE | 102009002068 A1 | 10/2010 |
| DE | 102010026910 A1 | 8/2011 |
| DE | 102010063035 A1 | 6/2012 |
| DE | 10 2011 011 802 A1 | 8/2012 |
| DE | 102011081046 A1 | 2/2013 |
| DE | 102011114031 A1 | 3/2013 |
| EP | 1 114 746 A2 | 7/2001 |
| EP | 2 305 505 A2 | 4/2011 |

OTHER PUBLICATIONS

German Office Action for Appln. No. 102013021875.6 dated Aug. 8, 2014.
PCT/EP2014/003122, Nov. 22, 2014, Michael Wachinger, Audi AG.
102013021875.6, Dec. 21, 2013, Michael Wachinger, Audi AG.
English translation by WIPO of International Preliminary Report on Patentability for PCT/EP2014/003122 dated Jun. 23, 2016.
Office Action dated Feb. 14, 2018, in corresponding Chinese Patent Application No. 201480069216.1, 7 pgs.

* cited by examiner

SENSOR DEVICE AND METHOD FOR GENERATING ACTUATION SIGNALS PROCESSED IN DEPENDENCE ON AN UNDERLYING SURFACE STATE

CROSS REFERENCE TO RELATED APPLICATIONS

This application is the U.S. national stage of International Application No. PCT/EP2014/003122, filed Nov. 22, 2014 and claims the benefit thereof. The International Application claims the benefit of German Application No. 102013021875.6 filed on Dec. 21, 2013, both applications are incorporated by reference herein in their entirety.

BACKGROUND

Described below are a sensor device for generating an actuation signal, processed in dependence on an underlying surface state, wherein the sensor device has a transducer for converting an actuation, applied to the transducer, into a raw actuation signal. The transducer can have, for example, a touch screen or a touch pad.

Also described is a vehicle which has such a sensor device. The vehicle can be, for example, an aircraft, a water craft and/or a land craft, in particular a passenger car or a truck.

In addition, a method for generating an actuation signal which is processed in dependence on an underlying surface state is described.

In the case of an operator control part (for example touch pad) in which an actuation force or an actuation movement plays a role, undesired triggering of a function can occur on a poor quality underlying surface. The cause of this is the mass inertia of the hand or finger on the operator control part and the associated undesired application of a force to the operator control part.

US2011/0084913A1 describes a method for arranging actuation symbols on a touch-sensitive display in a manner which is adapted to the situation and as a function of a movement activity which is sensed by an acceleration meter. In order to carry out the known method, a separate acceleration meter is required which increases the expenditure on manufacture and maintenance, as well as the risk of a failure, the space required in the vehicle and the weight of the vehicle.

SUMMARY

Described herein is a sensor device for generating an actuation signal which is processed in dependence on an underlying surface state and whose expenditure on manufacture and maintenance, risk of failure, space required in the vehicle and weight is lower than the expenditure on manufacture and maintenance, the risk of failure, the space required and the weight of the known sensor device. Furthermore, a vehicle having a sensor device (for generating an actuation signal processed in dependence on an underlying surface state) which has corresponding advantages is also described. Also, a method for generating an actuation signal which is processed in dependence on an underlying surface state permits the manufacture of a sensor device and of a vehicle with the specified advantages.

A sensor device for generating an actuation signal which is processed in dependence on an underlying surface state has a transducer for converting an actuation, applied to the transducer, into a raw actuation signal. The sensor device includes an acceleration intermediary for converting an acceleration of the transducer into an actuation which is applied to the transducer, an underlying surface state detector for generating an underlying surface state signal by evaluating the raw actuation signal and an actuation signal generator for generating the actuation signal, processed in dependence on an underlying surface state, by evaluating the raw actuation signal taking into account the underlying surface state signal.

A corresponding method for generating an actuation signal, processed in dependence on an underlying surface state includes converting an acceleration of a transducer into an actuation which is applied to the transducer by an acceleration intermediary, converting a first actuation, applied to the transducer, into a raw actuation signal by the transducer, generating an underlying surface state signal by evaluating the raw actuation signal, generating the actuation signal, processed in dependence on an underlying surface state, by evaluating the raw actuation signal taking into account the underlying state signal.

One concept described herein is using a transducer to convert an actuation, applied to the transducer, into a raw actuation signal and also to sense an actuation which provides information about a state of the underlying surface on which the vehicle in which the sensor device is arranged is located.

It is desirable for the acceleration intermediary to include a movably mounted inert mass. A difference in acceleration between the transducer and acceleration intermediary can be used to generate an actuation force which triggers actuation of the transducer. The movably mounted inert mass constitutes an object on which acceleration forces act. The acceleration thereof can be sensed on the basis of a movement of the inert mass and/or on the basis of forces which the inert mass applies to a stop. The inert mass can be, for example, a pin, a plate or a ball. The inert mass can be movably arranged, for example, by guiding, for example, in a guiding tube). An embodiment variant provides that the inert mass is loosely arranged within such a guiding means, that is to say can move freely there between (typically two) stops. It corresponds to the concept if at least one of the two stops is formed via the transducer.

It is advantageous if a resetting element is arranged between the transducer and the acceleration intermediary. An embodiment variant provides that the resetting element is attached on its first engagement side to the acceleration intermediary and on its other engagement side to the transducer. In the acceleration-free state of rest, the acceleration intermediary is moved relative to the transducer into a defined position of rest by the resetting element. As a result of the fact that the acceleration-free position of the acceleration intermediary is therefore unambiguous and known, the generation of an underlying surface state signal is facilitated and/or improved by evaluating the raw actuation signal.

An embodiment provides that the acceleration intermediary is arranged on a side of the transducer which faces away from an actuation side of the transducer. Some functional principles (for example projected-capacitive transducer) permit a configuration of the transducer in which the same transducer can be actuated both from a front side of the transducer and from a rear side of the transducer. If the transducer is arranged on a second actuation side of the transducer which faces away from a first actuation side of the transducer, the first actuation side can be kept free for actuations which are not carried out by the acceleration intermediary (but rather, for example, manually). This permits the sensor device to be designed in a way which is ergonomically expedient and attractive in terms of its design (for example for a man-machine interface with these advantages).

A further embodiment provides that the acceleration intermediary is arranged in a mount of the transducer, in which mount the transducer is mounted with residual mobility, wherein the acceleration intermediary is prepared to apply to the transducer the actuation, applied by the acceleration intermediary, if the transducer is accelerated with respect to the mount. As a result, it is possible to dispense with an inert mass which is different from the transducer. Depending on the viewpoint, the transducer here constitutes an inert mass which has the difference in acceleration with respect to the mount and therefore with respect to the acceleration intermediary. An alternative (likewise possible) viewpoint is that the object (for example a dashboard of a vehicle) to which the mount is attached constitutes an inert mass which has the difference in acceleration with respect to the transducer which is mounted on the mount with a residual mobility. Irrespective of the viewpoint, the difference in acceleration between the transducer and mount can be used to generate an actuation force which triggers actuation of the transducer.

The embodiments described below provide that a method of functioning of the transducer is based on detection of a change in capacitance, which is caused by the actuation, and in that a method of functioning of the acceleration intermediary is based on the causing of a change in capacitance. As a result, advantages of transducers whose actuation detection is based on a capacitive principle can be used for the sensor device.

For some fields of application it may be expedient if a method of functioning of the transducer is based on detection of a change in a magnetic field, which change is caused by the actuation, and in that a method of functioning of the acceleration intermediary is based on the causing of a change in a magnetic field. As a result, advantages of transducers whose actuation detection is based on a magnetic principle (for example use of the Hall effect) can be used for the sensor device.

It can also be advantageous if a method of functioning of the transducer is based on detection of a change in resistance, which change is caused by the actuation, and in that a method of functioning of the acceleration intermediary is based on the causing of a change in resistance. As a result, advantages of transducers whose actuation detection is based on a resistive principle can be used for the sensor device.

BRIEF DESCRIPTION OF THE DRAWINGS the accompanying drawings of which:

These and other aspects and advantages will become more apparent and more readily appreciated from the following description of the exemplary embodiments, taken in conjunction with the appended drawings of which:

DETAILED DESCRIPTION OF THE PREFERRED EMBODIMENT

Figure 1:
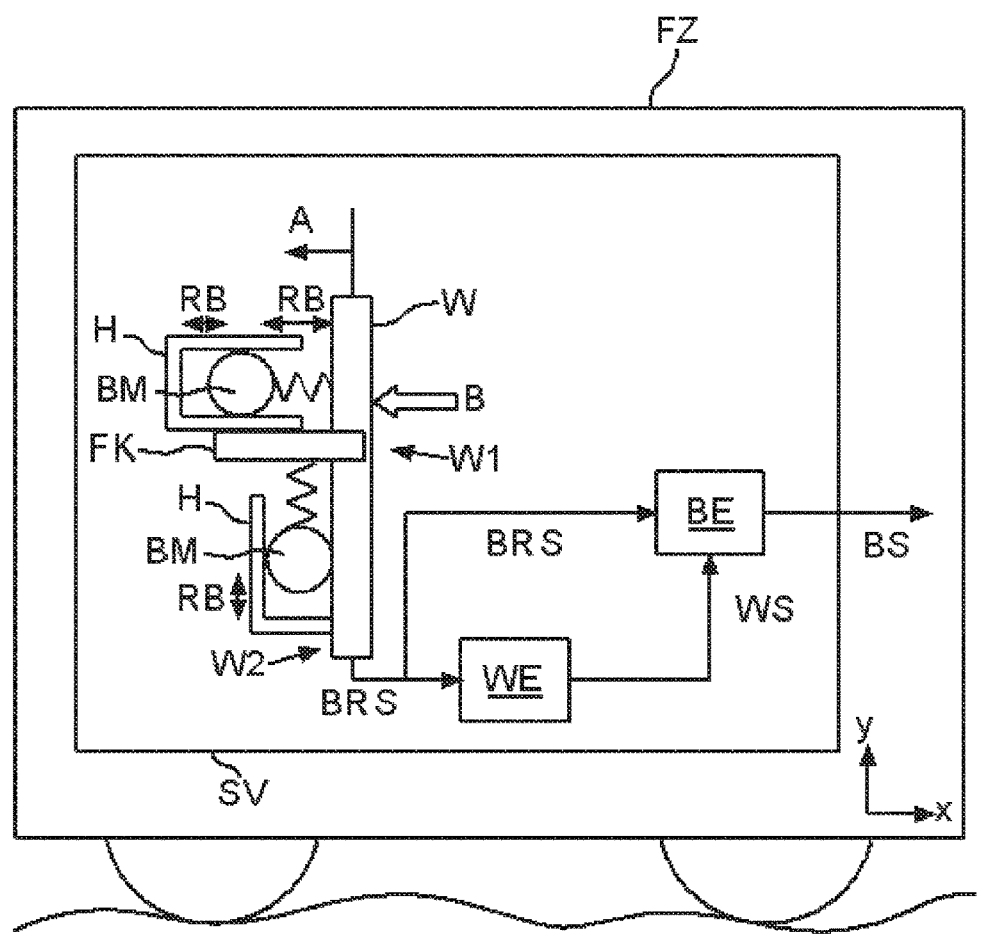
FIG. 1 is a schematic view of a first embodiment of a sensor device for generating an actuation signal processed in dependence on an underlying surface state.

The exemplary embodiments which are described in more detail below constitute preferred embodiments, examples of which are illustrated in the accompanying drawings, wherein like reference numerals refer to like elements throughout.

The vehicle FZ shown in FIG. 1 has a sensor device SV. The sensor device SV includes a transducer W, an acceleration intermediary BM, an underlying surface state detector WE and an actuation signal generator BE. The acceleration intermediary BM is movably arranged in a mount H. The acceleration intermediary BM has residual mobility RB with respect to the transducer W there. The acceleration intermediary BM has an inert mass M with which, in the case of accelerations A of the transducer W with respect to the mount H, such as occur in the respective instance of application, static friction, sliding friction and/or rolling friction of the acceleration intermediary BM in the mount H is reliably overcome.

The acceleration intermediary BM has an electric, dielectric, magnetic or other property which is suitable for triggering an actuation B of the transducer in accordance with its functional principle (for example capacitive, magnetic, resistive, optical). In the case of an actuation B of the transducer W, the transducer W outputs a raw actuation signal BRS which is fed both to the underlying surface state detector WE and to the actuation signal generator BE. The underlying surface state detector WE evaluates the raw actuation signal BRS with respect to signal properties of the raw actuation signal BRS which are characteristic of the type of underlying surface FW which is currently being traveled on (for example freeway, cobblestones, off-road surface), and generates an underlying surface state signal WS which is fed to the actuation signal generator BE. The actuation signal generator BE evaluates the raw actuation signal BRS taking into account the underlying surface state signal WS.

Figure 2:
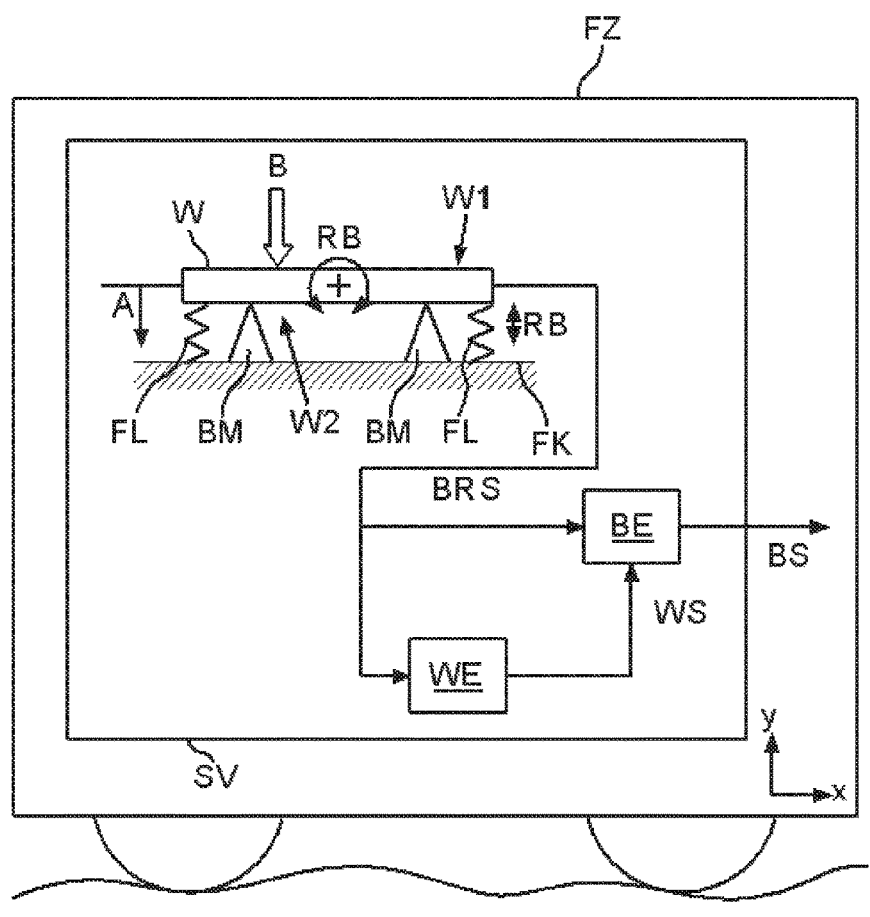
FIG. 2 is a schematic view of a second embodiment of a sensor device for generating an actuation signal processed in dependence on an underlying surface state.

The transducer W of the sensor device SV illustrated in FIG. 2 is arranged horizontally (with respect to vehicle coordinates x, y). The transducer W is mounted on spring bearings FL and can move, within a residual mobility RB, with respect to the vehicle coordinates x, y in the horizontal direction x and in the vertical direction y. Rotatability about a pitching axis, rolling axis and/or yaw axis is also possible. In the case of vertical movements of the vehicle FZ, the transducer W is moved relative to the vehicle body FK owing to the inert mass of the transducer W. The same applies to horizontal movements. In the case of rotational movements about a pitching axis, rolling axis and/or yaw axis, the transducer W is rotated relative to the vehicle body FK about a pitching axis, rolling axis and/or yaw axis, owing to the moment of mass inertia of the transducer W. As a result of the movement of the transducer W, one or more movement intermediaries BM, which are directly or indirectly attached to the vehicle body FK, are moved relative to the transducer W and therefore trigger an actuation B of the transducer W in accordance with its functional principle (for example capacitive, magnetic, resistive, optical).

Figure 3:
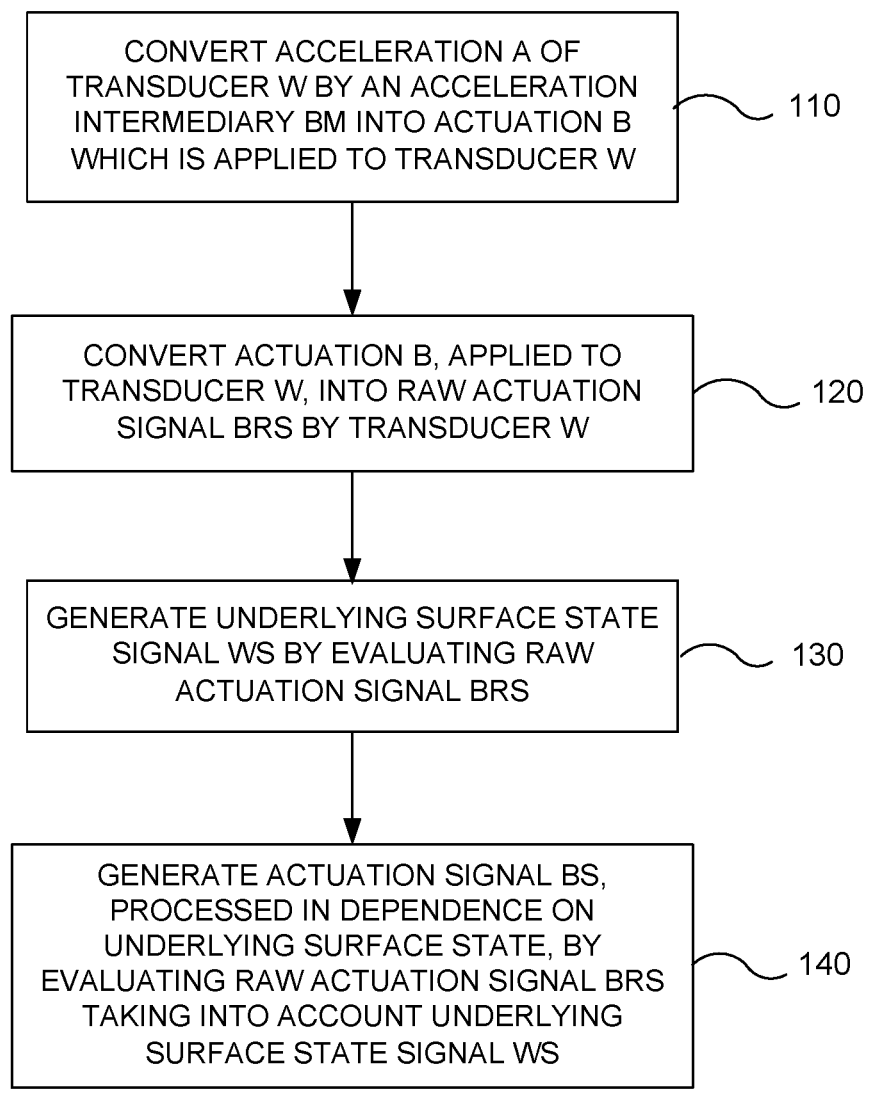
FIG. 3 is a flowchart of a method for generating an actuation signal processed in dependence on an underlying surface state.

The method 100 shown in FIG. 3 for generating an actuation signal BS processed in dependence on an underlying surface state includes, an acceleration A of a transducer W is converted 110 by an acceleration intermediary BM into an actuation B which is applied to the transducer W. Then, an actuation B, applied to the transducer W, is converted 120 into a raw actuation signal BRS by the transducer W. Next, an underlying surface state signal WS is generated 130 by evaluating the raw actuation signal BRS. Finally, the actuation signal BS, processed in dependence on the underlying surface state, is generated 140 by evaluating the raw actuation signal BRS taking into account the underlying surface state signal WS.

Using the sensor device SV described above, the raw actuation signal BRS can be processed, by determining an underlying surface state signal WS, in such a way that a poor quality underlying surface can be detected without a separate acceleration sensor. When a poor quality underlying surface is detected, a force threshold of the operator control part can be increased or the operator control part can be blocked with respect to inputs (actuations) for a specific time period.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A sensor device, movably mounted on a mount in a passenger compartment of a vehicle, for generating an actuation signal, comprising:
    a transducer generating a raw actuation signal, based on a combination of first and second actuations, upon manual application of the first actuation to an actuation side of the transducer facing the passenger compartment;
    an acceleration intermediary, disposed in the mount on an opposite side of the transducer facing away from the actuation side, applying the second actuation to the opposite side of the transducer in response to acceleration of the transducer relative to the mount;
    an underlying surface state detector generating an underlying surface state signal by evaluating the raw actuation signal; and
    an actuation signal evaluator generating the actuation signal from the raw actuation signal based on the underlying surface state signal.

2. The sensor device as claimed in claim 1, wherein the acceleration intermediary includes a first inert mass movably coupled to the transducer.

3. The sensor device as claimed in claim 2, wherein the vehicle has a body, and
    wherein the acceleration intermediary further includes a second inert mass movably coupled to the body of to the vehicle.

4. The sensor device as claimed in claim 1, wherein the underlying surface state signal generated by the underlying surface state detector indicates at least one characteristic of a road surface on which the vehicle is traveling based on signal properties of the raw actuation signal.

5. A sensor device, mounted on a mount with residual mobility, in a passenger compartment of a vehicle, for generating an actuation signal, processed in dependence on an underlying surface state, the sensor device comprising:
    a transducer converting a first actuation, applied to the transducer, and a second actuation, manually applied to an actuation side of the transducer facing the passenger compartment, into a raw actuation signal;
    an acceleration intermediary, arranged in the mount on an opposite side of the transducer facing away from the actuation side, converting an acceleration of the transducer relative to the mount into the first actuation which is applied to the opposite side of the transducer;
    an underlying surface state detector generating an underlying surface state signal by evaluating the raw actuation signal; and
    an actuation signal generator generating the actuation signal, processed in dependence on the underlying surface state, by evaluating the raw actuation signal taking into account the underlying surface state signal.

6. The sensor device as claimed in claim 5, wherein the acceleration intermediary includes a movably mounted inert mass.

7. The sensor device as claimed in claim 5, further comprising a resetting element arranged between the transducer and the acceleration intermediary.

8. The sensor device as claimed in claim 5,
    wherein the transducer detects a first change in capacitance caused by the first actuation, and
    wherein the acceleration intermediary causes a second change in capacitance.

9. The sensor device as claimed in claim 5,
    wherein the transducer detects a first change in at least one magnetic field, caused by the second actuation, and
    wherein the acceleration intermediary causes a second change in the at least one magnetic field.

10. The sensor device as claimed in claim 5,
    wherein the transducer detects a first change in resistance caused by the first actuation, and
    wherein the acceleration intermediary causes a second change in resistance.

11. A vehicle for moving across a surface, comprising:
    a body having a mounting structure; and
        a sensor device, mounted on the mounting structure with residual mobility, generating an actuation signal based on a surface state of the surface on which the vehicle moves, the sensor device comprising:
        a transducer, having an actuation side facing a passenger compartment of the vehicle and an opposite side facing away from the actuation side, converting first and second actuations applied to the transducer into a raw actuation signal, the second actuation being manually applied to the actuation side of the transducer;
        an acceleration intermediary, disposed in the mounting structure on the opposite side of the transducer, converting an acceleration of the transducer relative to the mounting structure into the first actuation and applying the first actuation to the opposite side of the transducer;
        a surface state detector generating a surface state signal by evaluating the raw actuation signal; and
        an actuation signal generator generating the actuation signal by evaluating the raw actuation signal based on the surface state signal.

12. The vehicle as claimed in claim 11, wherein the acceleration intermediary includes a movably mounted inert mass.

13. The vehicle as claimed in claim 12, further comprising a resetting element disposed between the transducer and the acceleration intermediary.

14. The vehicle as claimed in claim 13, wherein the transducer detects a first change in capacitance caused by the acceleration intermediary, and a second change in capacitance caused by the second actuation.

15. The vehicle as claimed in claim 14, wherein the transducer detects a first change in at least one magnetic field caused by the acceleration intermediary, and a second change in the at least one magnetic field caused by the second actuation.

16. The vehicle as claimed in claim 15, wherein the transducer detects a first change in resistance caused by the acceleration intermediary, and a second change in resistance caused by the second actuation.

17. A method for generating an actuation signal, processed in dependence on an underlying surface state, for a vehicle, the method comprising:
converting an acceleration of a transducer into a first actuation;
applying the first actuation to a first side the transducer by an acceleration intermediary arranged in a mount on which the transducer is mounted with residual mobility;
converting the first actuation, applied to the transducer, and a second actuation, manually applied to a second side of the transducer opposite the first side and facing a passenger compartment of the vehicle, into a raw actuation signal by the transducer;
generating an underlying surface state signal by evaluating the raw actuation signal; and generating the actuation signal by evaluating the raw actuation signal taking into account the underlying surface state signal.

* * * * *

UNITED STATES PATENT AND TRADEMARK OFFICE
CERTIFICATE OF CORRECTION

PATENT NO. : 10,331,279 B2
APPLICATION NO. : 15/106706
DATED : June 25, 2019
INVENTOR(S) : Michael Wachinger Page 1 of 1

It is certified that error appears in the above-identified patent and that said Letters Patent is hereby corrected as shown below:

In the Claims

Column 5, Line 50, In Claim 3, after "of" delete "to".

Column 7, Line 13, In Claim 17, after "side" insert -- of --.

Signed and Sealed this
Tenth Day of September, 2019

Andrei Iancu
*Director of the United States Patent and Trademark Office*